US Patent 2,962,512 — Patented Nov. 29, 1960

2,962,512
OXIDATION OF STEROIDS AND PRODUCTS THEREOF

Seymour Bernstein, Pearl River, Louis I. Feldman, Spring Valley, and William S. Allen and Robert H. Blank, Pearl River, N.Y., assignors to American Cyanamid Company, New York, N.Y., a corporation of Maine No Drawing. Filed May 26, 1959, Ser. No. 815,809

6 Claims. (Cl. 260—397.45)

This invention relates to the oxidation of steroids, especially to the introduction of an alpha hydroxyl group at the 7-position of the steroid nucleus by a biological process.

This application is a continuation-in-part of Serial No. 700,985, filed May 26, 1959, and now abandoned.

Recently, a number of steroids having a hydroxyl group at the 11-position have become important therapeutic agents in the treatment of diseases. Among these steroids is Kendall's Compound F. Processes of producing this substance from 11-desoxy steroids have been developed. However, processes for the introduction of an alpha hydroxyl group at the 7-position using the genus Cephalosporium have not been described. The present invention provides a means of introducing an alpha hydroxyl group at the 7-position of Reichstein's Substance S, progesterone, corticosterone related steroids and derivatives thereof.

The process of the present invention can be illustrated by the following reaction:

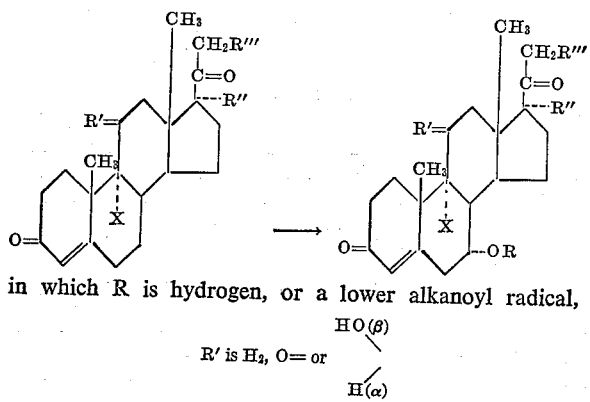

in which R is hydrogen, or a lower alkanoyl radical,

R' is H$_2$, O= or $\begin{array}{c}\text{HO}(\beta)\\ \diagdown\\ \diagup\\ \text{H}(\alpha)\end{array}$ R'' is hydrogen or a hydroxyl radical, R''' is hydrogen, hydroxyl or a lower alkanoyloxy radical and X is hydrogen or a halogen atom. The 7α-hydroxyl group can be acylated to produce the corresponding ester.

Reichstein's Substance S, which is Δ$^4$-pregnene-17α,21-diol-3,20-dione, is a commercially available product made from diosgenin, the original sources of which is various species of Mexican yams of the family Dioscoreaceae. Progesterone, corticosterone and other starting materials are readily available. Process of the present invention yields primarily the desired 7α-hydroxy steroid which can be readily recovered by extraction processes such as will be described hereinafter.

The process of the present invention is a fermentative oxidation using organisms of the class Fungi imperfecti, which in general reproduce asexually. The genus Cephalosporium is useful in the present process. Species of this genus include, for example, the species asperum, Z 164, curtipes, acreamonium, roseo-griseum, NRRL 1866, humicola, corenoides, koningi, abrardi, apii, calophylli, diospyri, gregantum, kiliense, recifei, rubrobrunnneum, salmosynnematum, spinosum, asteroides-griseum-griitzii, hallagii, charticola, ciferrii, coccidicolum, coccorum, deformans, falciforme, furcatum, gramineum, lamellaecola, lanoso-niveum, lecanii, lefrogi, longisporum, niveo-lanosum, potronii, pseudofermentum, rubescens, sclerotigenum, serrae, spinosum, stuhmeri, subverticillatum, Fabacinum. Although species of the genus Cephalosporium are broadly operative in the method of the present invention, the species Z 164 and asperum are preferably utilized for reasons of economy and productivity. Culture Z 164 (referred to hereinafter) has been examined and found to be morphologically and physiologically identical to Cephalosporium sp. NRRL 1866.

The microorganisms can be obtained from known sources, such as the Northern Regional Research Laboratories, Peoria, Illinois, or Centraal-bureau voor Schimmelcultures, Baarn, Holland. Alternatively, they may be isolated from natural sources by standard microbiological techniques.

In carrying out the process of the present invention, a fungus of the Cephalosporium genus is cultivated aerobically in a suitable nutrient medium and allowed to act upon a 7-desoxy steroid such as Substance S or an ester thereof, such as acetate or a related 7-desoxy steroid such as progesterone, desoxycorticosterone and the like. During growth of the organism under favorable conditions, an alpha hydroxyl group is introduced into the 7-position. The exact mechanism of this oxidation is obscure, but it is the result of enzymes produced by the organism as it grows. A suitable nutrient medium contains a soluble source of carbon, nitrogen, and mineral elements. Sources of carbon include corn starch, molasses, maltose, dextrose, sucrose, xylose, galactose, glycerol, mannitol and various organic acids, such as citric acid, malic acid, acetic acid, and various natural products containing carbohydrates, such as corn steep liquor, soybean meal, cottonseed meal, and many other available materials which have been used heretofore as a source of carbon in fermentation processes. Usually, a variety of the above can be employed in the medium with good results.

Suitable sources of nitrogen include some of the above-named materials, such as corn steep liquor, soybean meal, cotton seed meal, and the like, and various other substances, such as beef extract, casein, yeast, enzymatically digested proteins, and degradation products, including peptones, amino acids, and many other available proteinaceous materials which have been found suitable in fermentation processes for the support of growth of fungi. Various inorganic sources of nitrogen, including urea, ammonium salts, nitrates, and the like, may also be included in the medium as a source of assimilable nitrogen to provide a favorable growth substrate for the organism.

Ordinarily, much of the mineral requirements of the fermentation are present in the crude materials that are used to furnish sources of carbon and nitrogen or occur in the water that is used in the process. Generally, however, it is advisable to supplement the minerals normally present with added amounts to obtain a maximum growth of the fungus. Cations and anions which may be desirable in added amounts include the phosphate, sulphate, chloride, sodium, potassium, magnesium, iron, calcium, cobalt, manganese, and various others. Inasmuch as the use of mineral elements in supporting the growth of fungi is fairly well understood, elaboration appears to be unnecessary.

The 7-desoxy steriod may be added to the medium prior to, or one or two days after, inoculation. The fermentation is then continued for a period of one to five days or more to effect oxidation of the steriod.

To prepare inocula, 5 to 10 ml. of sterile water is used to suspend the surface growth of an agar test tube slant of the culture. The resulting suspension of spores and mycelium is used to inoculate two to three 100 ml. lots of sterile medium in 500 ml. Erlenmeyer flasks, as shown in the examples hereinafter. After inoculation, such flasks are incubated on a reciprocating shaker at 23° C. for about two to four days. The contents of two or three flasks are used to inoculate 12 liters of sterile medium in a 20-liter fermentor.

Fungi of the Cephalosporium genus grow at all temperatures between 5 to 37° C., and it is possible to carry out the oxidation process within these ranges. Temperatures between about 15 to 30° C. are preferred, with reaction usually carried out at about 23° C.

During the fermentation process, aeration is provided by forcing sterile air through the medium at a rate approximating 1/3 to 2 volumes of air per volume of medium per minute. Mechanical agitation is used to keep the mycelium and other insoluble materials in suspension. Anti-foaming agents, such as silicones, glyceride oils and the like, may be added from time to time and in amounts as needed.

The steroid to be oxidized is added to the fermentation in solution or in finely divided form. A preferred method is to dissolve a steroid in methanol or other water-miscible solvents and add it to the fermentation medium at the desired stage of the process. Although the steroid may precipitate from solution when so added, it is dispersed throughout the medium as a fine suspension and becomes readily available to the organism for oxidation. The amount of steroid added to the fermentation may vary considerably, but it is generally of the order of 1/10 to 1 gram per liter of medium.

At the conclusion of the fermentation process, the desired 7-hydroxylated steroid is recovered from the fermentation medium by the following procedure, which describes in particular a 10 ml. fermentation. This is a general procedure and is operative for fermentations of various sizes.

Acetone (100 to 150 ml.) is added to 10 ml. of fermented beer, and the mixture is allowed to stand at room temperature for a while and then filtered. The filtrate is concentrated under reduced pressure until no acetone remains (aqueous volume, 10 to 15 ml.). The aqueous residue is transferred to a separatory funnel, and about 100 ml. of water is added. The aqueous solution is then extracted four times with 20 ml. portions of methylene chloride. The four extracts are pooled, and the resulting solution is washed once with 2% aqueous sodium bicarbonate and then twice with about 50 ml. portions of saturated sodium chloride solution. The washed methylene chloride solution is dried over anhydrous magnesium sulfate and filtered. The filtrate is concentrated on a steam-bath at atmospheric pressure to 3–5 ml., and the concentrate is transferred to a 10 ml. volumetric flask and brought up to volume with methylene chloride. This solution is used for characterization of steroid content as described hereinafter.

In larger scale fermentations, the crude product or products may be recovered from the fermentation beer by simple solvent extraction, using a suitable water-immiscible solvent, such as chlorinated lower hydrocarbons, alcohols, esters, ketones, etc. Further purification and separation of steroid products from extracts may be accomplished by methods well understood by those skilled in the art. Separation of steroid mixtures often requires the use of chromatography.

One process employed to detect the steroids present in the extracted fermentation beer described above is by paper strip chromatography. Solvent systems used are water-methanol-benzene prepared by shaking approximately 50% water-50% methanol with benzene in a separatory funnel and then allowing the two layers to separate, or, in a like manner, shaking benzene (75 parts), petroleum-ether 90° to 100° (25 parts), acetic acid (40 parts), propionic acid (40 parts), and water (20 parts). A portion of the lower layer is placed in an open dish on the floor of a large glass cylinder. The upper layer is the mobile phase and is used to fill the trough-shaped well within the cylinder. A standard steroid solution is prepared by dissolving 10 mg. of each of the following steroids in 10 ml. of methylene chloride:

Reichstein's Substance S
Progesterone
Desoxycorticosterone (Other steroids can be included in the standard solution when appropriate.)

At least one standard steroid solution is chromatographed simultaneously each time an unknown solution is tested. Exactly 0.025 ml. of the standard steroid solution is applied to the paper strip at the starting line, four inches from the upper end of the strip, which is folded over the edge of the trough and immersed in the mobile phase within. The strip is then developed for two to four hours at 37° C. Similarly, 0.1 ml. of the unknown solution is applied to another strip which is then folded into the same trough and developed with the steroid standard strip. The trough permits development of many strips simultaneously. After proper development of the paper strips, they are removed from the apparatus and air-dried. After drying, the strips are sprayed with an alkaline solution of Blue Tetrazolium, which generates color with steroids which contain a ketol side-chain, or are viewed through a zinc sulfide plate after exposure to ultra-violet light, which permits detection of steroids containing a $\Delta^4$-3-ketone. Strips are aligned with at least one "standard" strip and evaluated. The different steroids can be identified by their positions on the strips.

The $7\alpha$-hydroxy steroids of the present invention are in general active as anti-inflammatory agents, a property typical of glucocorticoids such as hydrocortisone.

The specific examples which follow illustrate in detail the oxidation of Reichstein's Substance S and other representative steroids of the present invention.

*Example 1*

| | | |
|---|---|---|
| Corn steep liquor | ml | 0.6 |
| Dextrose | g | 2.0 |
| Edamin lactalbumin digest | g | 2.0 |
| Water | ml | 100 | pH adjusted to about 7 but the pH drops about one pH unit on autoclaving.

Twelve liters of the above medium, following autoclaving, have a pH of about 6.4. The medium is inoculated with 600 ml. of a three-day mycelial growth of Cephalosporium sp. (Lederle Culture No. Z 164). The fermentation is carried out at 28° C. for 48 hours, after which time 6 g. of Reichstein's Substance S dissolved in 120 ml. of methanol is added and fermentation continued for 120 hours. Daily samples are assayed by the chromatographic procedure and at the end of the cycle, the paper strip shows a weak spot for Substance S and a strong spot for the $7\alpha$-hydroxy derivative.

The resultant fermentation mixture is filtered and the mycelium washed with two liters of acetone. The extract is combined with the beer and the acetone evaporated under reduced pressure. The beer is then extracted with four successive two-liter volumes of methylene chloride; the extracts are combined and washed twice with saturated saline. After drying over anhydrous sodium sulfate, the extract is evaporated under reduced pressure, yielding 5 g. of a gummy solid.

The residue is then dissolved in a portion of the solvent phase from the system: ethyl acetate, 8; petroleum-ether (boiling point 90 to 100°), 3; methanol, 6; water, 4; and partitioned on a column consisting of 320 g. of diatomaceous earth and 160 g. of the water phase from the above system. The eluted fractions containing the desired steroid are combined and evaporated to dryness under reduced pressure yielding 4.5 g. of gummy solid. Crystallization of the residue from acetone-petroleum ether (60 to 70°) gives crystals melting at 209–211° C. $[\alpha]_D^{24}+94°$ (methanol); ultraviolet spectrum:

$$\lambda_{Max.}^{EtOH}\ 242\text{--}243\ m\mu\ (\epsilon 14{,}800)$$

The infra-red absorption spectrum indicates that the compound is $\Delta^4$-pregnene-$7\alpha,17\alpha,21$-triol-3,20-dione.

Example 2

One hundred ml. of medium (A) consisting of 2% molasses (Grandma's), 1% N-Z amine-type A (Sheffield), and 1% corn starch, pH adjusted to 7.0 in a 500 ml. Erlenmeyer flask is inoculated with a spore suspension of Cephalosporium species (Lederle Culture No. Z 164). The flask is placed upon a reciprocating shaker (120 strokes/min.) at 23° C. for 72 hours. At this time 2 ml. of the resulting growth is inoculated into another flask containing 100 ml. of medium (A). Incubation is carried out as above. After 24 hours, 20 mg. of progesterone dissolved in 1 ml. of methanol is added to the mash. Incubation is continued and 120 hours after the addition of steroid, paper chromatograms show a good yield of $7\alpha$-hydroxy-progesterone.

Example 3

Another experiment is carried out in which conditions are identical to those described in Example 2 except that 11-desoxycorticosterone (DOC) serves as the substrate. A paper chromatogram on the 120 hour sample shows only $7\alpha$-hydroxy-DOC. This product is present in good yield.

Example 4

In a further experiment using Cephalosporium sp. NRRL 1866 and *Cephalosporium asperum* with the conditions described in Example 2 in which Reichstein's Substance S serves as substrate, $7\alpha$-hydroxy-Reichstein's Substance S is obtained after 96 hours of fermentation.

Example 5

A solution of 100 mgm. of $\Delta^4$-pregnene-$7\alpha,17\alpha,21$-triol-3,20-dione in 1 ml. of pyridine is treated with 0.026 ml. of acetic anhydride and allowed to stand overnight. Water is added and the crystals filtered off and washed with water. A yield of 60 mgm. of $\Delta^4$-pregnene-$7\alpha,17\alpha,21$-triol-3,20-dione 21-acetate (54%) is obtained (melting point 197° to 203° C.). Recrystallization from acetone-petroleum ether raises the melting point to 210° to 211.5° C. The product has the following properties: $[\alpha]_D+111°$ ($\alpha_D=+1.27°$, 11.46 mg., 1 ml. CHCl$_3$). Ultraviolet spectrum:

$$\lambda_{Max.}^{EtOH}\ 242\ m\mu\ (\epsilon 15{,}300)$$

Infra-red spectrum:

$$\nu_{Max.}^{KBr}\ 3510,\ 1740,\ 1712,\ 1688,\ 1630,\ 1240,\ 1070\ cm^{-1}$$

Example 6

A mixture of 60 mgm. of $\Delta^4$-pregnene-$7\alpha,17\alpha,21$-triol-3,20-dione, 5 ml. of pyridine, and 2 ml. of acetic anhydride is allowed to stand overnight at room temperature. The solution is poured into ice water and the crystalline material filtered off and air-dried. A 60 mgm. (81%) yield of $\Delta^4$-pregnene-$7\alpha,17\alpha,21$-triol-3,20-dione 7,21-diacetate is obtained (melting point 253.5° to 256° C.).

Recrystallization from acetone-petroleum ether changes the melting point to 246° to 248° C. $[\alpha]+107°$ ($\alpha_D=+1.00$, 18.72 mg., 2 ml. CHCl$_3$). Ultraviolet spectrum:

$$\lambda_{Max.}^{EtOH}\ 238\ m\mu\ (\epsilon 16{,}100)$$

Infra-red spectrum:

$$\nu_{Max.}^{KBr}\ 3550,\ 1754\ \text{(shoulder)},\ 1740,\ 1660,\ 1632,\ 1235,\ 1042\ cm^{-1}$$

Example 7

A solution of 0.5 g. of $\Delta^4$-pregnene-$7\alpha,17\alpha,21$-triol-3,20-dione in 50 ml. of glacial acetic acid is shaken with 5.0 g. of sodium bismuthate for 25 minutes. After the addition of water, a solution of 35 g. of potassium hydroxide in 30 ml. of water is added, and the resultant mixture is further neutralized with sodium bicarbonate. The solution is extracted with chloroform, and the extract is washed once with saturated sodium bicarbonate solution and thrice with saturated brine. The extract is dried over anhydrous magnesium sulfate and evaporated, leaving a residue, which is then crystallized from acetone-petroleum ether to yield 107 mgm. of a product, $\Delta^4$-androstene-$7\alpha$-ol-3,17-dione, with a melting point of 214° to 215° C. Recrystallization from acetone-petroleum ether raises the melting point to 220° to 222.5° C. $[\alpha]_D^{24}+178°$ ($\alpha_D+2.14°$, 12.05 ml., 1 ml. CHCl$_3$). Ultraviolet spectrum:

$$\lambda_{Max.}^{EtOH}\ 241\text{--}242\ m\mu\ (\epsilon 16{,}800)$$

Infra-red spectrum:

$$\nu_{Max.}^{KBr}\ 3390,\ 1748,\ 1652,\ 1087\ cm^{-1}$$

Example 8

In another experiment carried out under the conditions described in Example 2 except that the following compounds were used as substrates; $9\alpha$-fluoro-$11\beta$-hydroxyprogesterone, corticosterone, $9\alpha$-fluoro-corticosterone, $9\beta,11\beta$-epoxy-Reichstein's Substance S, the $7\alpha$-hydroxy derivative was produced.

Example 9

*Nocardia corallina* (ATCC 999) is grown in a series of 100 ml. shaker tubes containing 10 ml. of a medium consisting of 1.0% cerelose, 0.1% yeast extract (Difco), 0.25 NaCl, 0.4% beef extract (Bacto), 0.4% peptone. Incubation is carried out on a reciprocating shaker at 28° C. Sixteen hours after inoculation, 2 mg. of each of steroid in solution in 0.1 ml. of methanol, is added to individual tubes. The steroids fermented are $9\alpha$-fluoro-$7\alpha,11\beta$-dihydroxyprogesterone; $7\alpha$-hydroxycorticosterone, and $9\alpha$-fluoro-$7\alpha$-hydroxycorticosterone. The fermentation is then continued under the same conditions as described. Samples are taken at 1, 3 and 8 hours after steroid addition. In each instance, a substantial quantity of the 1,2-dehydro derivative is produced.

We claim:

1. The compound $9\alpha$-fluoro-$7\alpha,11\beta$-dihydroxyprogesterone.

2. The compound $\Delta^1$-$9\alpha$-fluoro-$7\alpha,11\beta$-dihydroxyprogesterone.

3. The compound $7\alpha,11\beta,21$-trihydroxy-1,4-pregnadiene-3,20-dione.

4. The compound $9\alpha$-fluoro-$7\alpha,11\beta,21$-trihydroxy-4-pregnene-3,20-dione.

5. The compound $9\alpha$-fluoro-$7\alpha,11\beta,21$-trihydroxy-1,4-pregnadiene-3,20-dione.

6. Compounds of the group consisting of $9\alpha$-fluoro-$7\alpha,11\beta$-dihydroxyprogesterone;
$\Delta^1$-$9\alpha$-fluoro-$7\alpha,11\beta$-dihydroxyprogesterone;
$7\alpha,11\beta,21$-trihydroxy-1,4-pregnadiene-3,20-dione;
$9\alpha$-fluoro-$7\alpha,11\beta,21$-trihydroxy-4-pregnene-3,20-dione;
$9\alpha$-fluoro-$7\alpha,11\beta,21$-trihydroxy-1,4-pregnadiene-3,20-dione and the 7 and 21 lower alkanoic acid esters thereof.

References Cited in the file of this patent

UNITED STATES PATENTS

| | | |
|---|---|---|
| 2,684,968 | Bergstrom | July 27, 1954 |
| 2,695,260 | Murray | Nov. 23, 1954 |
| 2,702,809 | Murray et al. | Feb. 22, 1955 |
| 2,745,851 | Mooradian | May 15, 1956 |
| 2,745,852 | Ehrhard | May 15, 1956 |
| 2,753,290 | Fried et al. | July 3, 1956 |
| 2,756,179 | Fried | July 24, 1956 |
| 2,831,857 | Ruzicka et al. | Apr. 22, 1958 |